United States Patent [19]

Bhore et al.

[11] Patent Number: 5,254,322

[45] Date of Patent: Oct. 19, 1993

[54] METHOD FOR REDUCING AUTOMOTIVE $NO_x$ EMISSIONS IN LEAN BURN INTERNAL COMBUSTION ENGINE EXHAUST USING A TRANSITION METAL-CONTAINING ZEOLITE CATALYST WHICH IS IN-SITU CRYSTALLIZED

[75] Inventors: Nazeer A. Bhore, Wilmington, Del.; Francis G. Dwyer, West Chester, Pa.; David O. Marler, Deptford; John P. McWilliams, Woodbury, both of N.J.

[73] Assignee: Mobil Oil Corporation, Fairfax, Va.

[21] Appl. No.: 927,108

[22] Filed: Aug. 10, 1992

[51] Int. Cl.⁵ .................. B01J 8/00; C01B 21/00; B01D 47/00

[52] U.S. Cl. .................. 423/239.2; 423/212

[58] Field of Search .......... 423/212, 239 Z, 239, 423/239 A

[56] References Cited

U.S. PATENT DOCUMENTS

| | | | |
|---|---|---|---|
| 4,091,007 | 5/1978 | Dwyer et al. | 260/448 |
| 4,157,375 | 6/1979 | Brown et al. | 423/239 |
| 4,175,375 | 11/1979 | Takase | 58/23 |
| 4,297,328 | 10/1981 | Ritscher et al. | 423/213.2 |
| 4,522,705 | 6/1985 | Chu et al. | 208/120 |
| 4,800,187 | 1/1989 | Lachman et al. | 502/64 |
| 5,041,270 | 8/1991 | Fujitani et al. | 423/213.2 |
| 5,041,272 | 8/1991 | Tamura et al. | 423/239 |
| 5,149,511 | 9/1992 | Montreuil et al. | 423/239 |

*Primary Examiner*—Gregory A. Heller
*Attorney, Agent, or Firm*—Alexander J. McKillop; Dennis P. Santini; Laurence P. Hobbes

[57] ABSTRACT

A method is provided for reducing $NO_x$ for high flow applications such as $NO_x$ abatement in an exhaust gas from an internal combustion engine operating under lean burn conditions wherein $NO_x$ is reduced by hydrocarbon reductants. The method employs a hydrothermally stable catalyst comprising transition metal-containing ZSM-5 which is prepared by in-situ crystallization of an aggregate comprising ZSM-5 seeds, silica, and a crystalline silicate.

20 Claims, No Drawings

METHOD FOR REDUCING AUTOMOTIVE NO$_x$ EMISSIONS IN LEAN BURN INTERNAL COMBUSTION ENGINE EXHAUST USING A TRANSITION METAL-CONTAINING ZEOLITE CATALYST WHICH IS IN-SITU CRYSTALLIZED

FIELD OF THE INVENTION

This invention is concerned with a method for reduction of nitrogen oxides contained in a gaseous stream such as lean burning internal combustion engine exhaust. The method employs a hydrothermally stable catalyst comprising transition metal-containing ZSM-5 which is prepared by in-situ crystallization of a preformed aggregate.

BACKGROUND OF THE INVENTION

Atmospheric pollution is a societal problem which is receiving much attention. The major source of such pollution is the extensive use of fossil fuels, although industrial and chemical processes, such as the manufacture of nitric acid, also contribute. The principal pollutants are nitrogen oxides, carbon monoxide, and perhaps to a lesser extent hydrocarbons, sulfur oxides and other objectionable gases and vapors.

Although several nitrogen oxides are known which are relatively stable at ambient conditions, it is generally recognized that two of these, viz., nitric oxide (NO) and nitrogen dioxide (NO2), are the principal contributors to smog and other undesirable environmental effects when they are discharged into the atmosphere. These effects will not be discussed further here since they are well recognized and have led various government authorities to restrict industrial emissions in an attempt to limit the level of the nitrogen oxides in the atmosphere. Nitric oxide and nitrogen dioxide, under appropriate conditions, are interconvertible according to the equation $$2NO + O2 = > 2NO2.$$

For purposes of the present invention NO$_x$ will be used herein to represent nitric oxide, nitrogen dioxide, and mixtures thereof.

Formation of man-made nitrogen oxides from the elements occurs in the high temperature zones of combustion processes. The internal combustion engine, and coal-, oil-, and gas-fired furnaces, boilers and incinerators, all contribute to NO$_x$ emissions. In general, fuel-rich combustion mixtures produce exhaust gases with lower contents of NO$_x$ than do lean mixtures. Although the concentrations of NO$_x$ in the exhaust gases produced by combustion usually are low, the aggregate amounts discharged in industrial and/or highly populated areas is adequate to cause problems.

The so-called "stable" nitrogen oxides have in common the somewhat peculiar property that although they are thermodynamically very unstable with respect to decomposition into elemental oxygen and nitrogen, no simple, economical method has been described for inducing this decomposition. A variety of catalysts are known which reduce NO$_x$ to N$_2$, using carbon monoxide, hydrogen or hydrocarbons in a net reducing environment. Since all three of these reductants are present in normal automobile emissions, this would appear to be a simple matter. Unfortunately, oxygen is also present in such emissions and most catalysts which reduce NO$_x$ will not operate effectively in an oxidizing atmosphere. Instead of reducing NO$_x$ the reductants reduce oxygen. One class of materials, copper-exchanged zeolites, have been used to overcome this problem, and have been shown to be suitable catalysts for reduction of NO$_x$ in automobile engine exhaust containing hydrocarbons which act as reductants. For example, U.S. Pat. No. 4,297,328 discloses concurrent catalytic reduction of oxides of nitrogen and the oxidation of carbon monoxide and hydrocarbons in a gas stream containing a stoichiometric excess of oxidant, over a copper-containing ZSM-5 zeolite. U.S. Pat. No. 5,041,270 discloses NO$_x$ reduction in the presence of hydrocarbons acting as reductant in an oxidizing atmosphere, over a catalyst containing copper loaded on a support. U.S. Pat. No. 5,041,272 discloses NO$_x$ reduction in the presence of excess oxygen, in the presence of organic reductant, e.g., using hydrocarbons over hydrogen form zeolites such as ZSM-5 which are impregnated with a metal such as copper.

Despite the initial effectiveness of such NO$_x$ reducing copper-containing catalysts employed in lean burn exhaust operations, their ultimate service life is severely limited during operations under hydrothermal conditions. Hydrothermal stability of NO$_x$ reduction catalysts is considered in U.S. Pat. No. 4,157,375. This reference discloses the preparation of a zeolite prepared from a calcined honeycomb preform such as kaolin with an aqueous solution of base (e.g., water, NaOH and tetrapropylammonium) to form a monolith containing ZSM-5. However, the resulting catalyst is used for reduction of nitrogen oxides in exhaust gases in the presence of "suitable reducing gas, ammonia, carbon monoxide, hydrogen or the like . . . added in an amount such that the added gas together with any reducing agent present (e.g., carbon monoxide) will be about equal to the stoichiometric amount required for a desired reduction of NO$_x$" (column 8, lines 14 to 21). The resulting catalyst is suited to operation at temperatures up to 800° C. in the absence of water and up to 700° C. in the presence of substantial amounts of water due to the sensitivity of zeolites to elevated temperature in the presence of steam. No mention is made of utilizing such a catalyst in NO$_x$ reduction employing a hydrocarbon reductant.

All of the above patents are incorporated herein by reference in their entirety.

BRIEF SUMMARY OF THE INVENTION

It has now been found that nitrogen oxides contained in an exhaust gas from an internal combustion engine operating under lean burn conditions can be reduced by contacting the exhaust gas at a temperature of at least 300° C. with a hydrothermally stable catalyst comprising a transition metal and a zeolite having the structure of ZSM-5 which is prepared by in-situ crystallization of an aggregate comprising ZSM-5 seeds, silica, and a crystalline silicate. The exhaust gas has a molar ratio of hydrocarbons to nitrogen oxides of at least the stoichiometric ratio, and the reduction of NO$_x$ is substantially effected by hydrocarbon reductant. It has been found that the catalysts employed in this invention are more heat and/or steam stable in this particular use than corresponding zeolite-containing catalysts prepared by other methods which enhance thermal and/or hydrothermal stability.

DETAILED DESCRIPTION AND SPECIFIC EMBODIMENTS

The present invention provides a catalyst which is significantly less susceptible to deactivation resulting from $NO_x$ reduction in an exhaust gas stream from a lean burning internal combustion engine. The catalyst employed is prepared by in situ crystallization of an aggregate, e.g, a preformed clay aggregate. As noted above, the aggregate comprises three inorganic components: ZSM-5 seeds, silica, e.g., a colloidal silica such as Ludox TM as available from DuPont, and a crystalline silicate. Optionally, the aggregate can also include alumina. The silicate can be a layered material or other crystalline component which is convertible, as a component of the aggregate, upon high temperature calcination and hydrothermal treatment to ZSM-5. The layered silicates are also known as phyllosilicates and are divided into a number of groups and subgroups according to their structure and chemical composition. The six main groups are: kaolinite-serpentine, pyrophyllite-talc, mica, chlorites, smectites-vermiculites, and polygorskites-sepiolites. The kaolinite-serpentine group is the preferred source of the crystalline silicate for the preparation of the aggregate; however, as mentioned previously, any layered silicate and many other crystalline silicates have utility in this area. Various techniques for preparing a suitable catalyst for such in situ crystallization are set out below.

U.S. Pat. 4,522,705 discloses a ZSM-5 of enhanced hydrothermal stability suitable for cracking hydrocarbons which is prepared by in-situ crystallization of preformed aggregates.

U.S. Pat. No. 4,091,007 discloses a method for the preparation of ZSM-5 prepared by in-situ crystallization of clay aggregates in the presence of tetraalkylammonium ions. The resulting ZSM-5 can be a discrete particle having a crystallinity of greater than 40 percent by preforming the reaction mixture oxides into pellets or extrudates which retain their shape and acquire substantial strength during the calcination process. In addition to the oxides, the reaction mixture contains a source of alkali metal cations and tetraalkylammonium cations, and water. The crystallized product can be handled in subsequent chemical processing, such as ion exchange, without necessitating cumbersome processes such as filtration. Further, these discrete particles can be used directly as catalysts after appropriate processing but without the need of any reformulation or pelletizing since the non-crystalline portion of the discrete particle serves as the porous matrix of the prior art compositions. One variation on the method of this disclosure which is well-suited to use in the present invention substitutes tetraalkylammonium cations with alkylamine, e.g. n-propylamine. Another variation employs high silica zeolite seeds in preparing the preformed composite particles whereby a highly crystalline product is obtained in the absence of organic compounds ordinarily employed in high silica zeolite in situ syntheses. Following the preforming operation, the discrete particles are calcined and then contacted with an alkali metal hydroxide or other hydroxide solution to achieve the desired degree of crystallization. The integrity of the composite particles is retained during the crystallization to provide a zeolite composition in particulate form which is attrition resistant and highly stable.

U.S. Pat. No. 4,800,187 discloses a method for crystallizing strongly bound zeolite such as ZSM-5 on the surface of a sintered monolithic ceramic by hydrothermal treatment with an aqueous base solution.

All of the above references disclose methods for preparing zeolites by in situ crystallization of a clay aggregate which are suited to use in the present invention and are accordingly incorporated herein by reference. In one embodiment, the zeolite is prepared from a clay aggregate which comprises a non-clay added source of silica.

The clay component which is treated to form the zeolite-containing catalyst can be selected from the group consisting of kaolin, halloysite, montmorillonite, illite, and dickite, with kaolin preferred.

The aggregate can be in the form of a monolith, e.g., a honeycombed monolith, or in the form of spheroids, cylinders, or other conventional catalyst shapes. Preferably the aggregate is in the form of a structure suitable for high flow applications, e.g., applications wherein the linear gas velocity is at least 3 meters per second. In an alternative embodiment, the zeolite prepared from in-situ crystallization is applied as a wash coat on a suitable support.

Generally, the catalyst of the present invention contains at least one transition metal. Preferred transition metals include those selected from the group consisting of copper, zinc, vanadium, chromium, manganese, iron, cobalt, nickel, rhodium, palladium, platinum, and molybdenum. Copper is especially preferred.

In addition to the transition metal, alkali or alkaline earth metals may be present in the catalyst in order to facilitate $NO_x$ reduction. Such metals include Na, K, Rb, Cs, Mg, Ca, and Ba.

The catalysts of the present invention are prepared by introducing transition metal or transition metal ions into the zeolite framework or within the zeolite pores by any suitable technique. The zeolite can be ion-exchanged, ion-doped, or loaded sufficiently so as to provide an efficient amount of catalytic metal within or on the zeolite. Alternatively, the metals or metal ions can be introduced to the non-zeolitic support, or to both the zeolite and the support.

The resulting catalyst exhibits thermal and/or hydrothermal stability at temperatures of at least 500° C., preferably at least 750° C., or even more preferably at least 800° C., under the conditions and test protocol set out in Example 6 of the specification, especially with regard to aging conditions and gas composition. For present purposes, thermal or hydrothermal stability can be measured in terms of percent of $NO_x$ conversion activity remaining after exposure to a temperature of 800° C. for 5 hours relative to the fresh acid activity of the zeolite. Preferably, the catalyst employed retains at least 70%, preferably at least 80 or even 90% of its original activity.

The present invention comprises contacting the above-described catalyst with an exhaust gas having hydrocarbons present at levels of at least the stoichiometric amount required to reduce the nitrogen oxides present. The hydrocarbons are preferably present in at least 3 times, more preferably at least 10 times the stoichiometric amount. Generally, the hydrocarbons can be present in amounts ranging from 1 to 10 times the stoichiometric amount.

The exhaust gases thus treated are derived from combustion occurring under lean burn conditions, i.e., above the soichiometric value of 14.7. Such conditions can comprise an air-to-fuel ratio greater than 14.7, say, 18 to 23, preferably 18 to 20. The contacting of exhaust gases with the catalyst occurs at a temperature of at least 300° C., preferably ranging from 350° to 800° C.

The present invention is operated under conditions wherein the catalyst is contacted with the exhaust gas at a space velocity no greater than 500000 vol/vol per hour, preferably no greater than 250000 vol/vol per hour. Suitable ranges include 20000 to 120000 vol/vol per hour, preferably 30000 to 80000 vol/vol per hour, on a gas hourly basis.

As noted above, the catalytic reduction of nitrogen oxides in the present invention is substantially effected by hydrocarbon reductant. By substantially effected is meant at least 90, 95, or even 99% of the observed $NO_x$ reduction is effected by hydrocarbon as reductant. The measurement of the effect of hydrocarbon as reductant can be determined by monitoring $NO_x$ conversion as a function of temperature whereby selected hydrocarbon reductants, such as propylene are added one at a time to an otherwise constant simulated exhaust gas containing primarily $N_2$, NO, $H_2O$, $O_2$, $CO_2$ and CO. The relative efficacy of each hydrocarbon for effecting $NO_x$ conversion can thus be determined. The most effective hydrocarbon reductants are those yielding the largest $NO_x$ reduction at the lowest temperature for a given (molar) concentration. Virtually 100% of the observed $NO_x$ reduction achieved is effected by hydrocarbon as reductant.

This invention will now be illustrated by examples. The examples are for illustrative purposes only and are not to be construed as limiting the scope of the invention, which scope is defined by this entire specification including the appended claims.

EXAMPLES

Example 1 (Comparative)

Preparation of High Activity ZSM-5

A ZSM-5 catalyst is prepared by a method which is known to provide a product of enhanced hydrothermal stability. 3.66 parts quantity, by weight, of a commercial precipitated silica, e.g., Ultrasil VN3 (available from Nasilco) were added to a mixture containing 1.00 parts $Al_2(SO_4)_3 \cdot 14H_2O$, 1.54 parts 50% NaOH, and 10.08 parts water. The mixture was heated to 160° C. in a stirred autoclave and held at that temperature for crystallization. After full crystallinity was achieved, the resulting crystals were separated from the remaining liquid by filtration, washed with water, and dried.

Example 2 (Comparative)

Preparation of Large Crystal ZSM-5

A ZSM-5 catalyst is prepared by a method which is known to provide a product of enhanced hydrothermal stability.

A sodium silicate solution was prepared by mixing 16.9 parts, by weight, of deionized water with 30.0 parts N-Brand sodium silicate (available from PQ Corp.). A 26% sodium chloride solution was prepared by dissolving 3.54 parts NaCl in 2.85 parts deionized water. An acid alum solution was prepared by mixing 18.6 parts deionized water, 1.04 parts aluminum sulfate, 3.12 parts 93% $H_2SO_4$, 3.5 parts 50% tetramethylammonium chloride, and 4.89 parts 35% tetrapropylammonium bromide.

0.5 parts deionized water were added to an autoclave and the sodium silicate and acid alum solutions were mixed and added to the autoclave through a nozzle which insured the formation of a homogeneous gel. The gel was then heated to 160° C. and that temperature was maintained under agitation for approximately 20 hours at which time the autoclave was cooled to room temperature. The crystallized slurry was removed from the autoclave and the ZSM-5 recovered by filtration and washing with deionized water and dried.

Example 3 (Comparative)

Preparation of High $SiO_2/Al_2O_3$ ZSM-5

A ZSM-5 catalyst is prepared by a method which is known to provide a product of enhanced hydrothermal stability.

A mixture of 653 parts, by weight, deionized water, 48.8 parts 50% NaOH, 6.77 parts aluminum sulfate, and 1.00 parts ZSM-5 crystals was added to a stirred autoclave. 227 parts of a precipitated silica, Ultrasil VN3, were slowly added to the solution. After the addition of 39.7 parts n-propylamine, the autoclave was heated, with stirring, to 104° C. After 44 hours at 104° C., the temperature was raised to 110° C. in order to remove the n-propylamine by flashing the organic into a collection vessel. After the removal of the organic and cooling the autoclave to room temperature, the ZSM-5 crystals were recovered by filtration, washing with deionized water, and drying.

Example 4

Preparation of Aggregate Based ZSM-5

A ZSM-5 catalyst of the present invention was prepared by adding a 1.00 parts quantity, by weight, of ammonium exchanged, small crystal ZSM-5 to 3.97 parts water. The resulting mixture was ball milled to reduce the mean particle size to less than 2 microns. The resultant slurry was added to 3.76 parts water and 12.5 parts Ludox TM AS-40, a commercial colloidal silica containing 40 wt % $SiO_2$ available from DuPont. The slurry was homogenized with a high speed mixer, and 16.14 parts Kaopaque TM 10 S clay available from Georgia Kaolin Co. were added and the mixing was continued to produce a slurry which was then spray dried. The spray dried material was calcined at 1000° C. for three hours.

A 16.83 parts quantity, by weight, of the calcined aggregate were added to a solution of 1.00 parts n-propylamine, 2.69 parts 50% NaOH, and 64.64 parts water. The mixture was then heated to 150° C. in a stirred autoclave. After crystallization was complete, the n-propylamine was removed from the autoclave by flashing and the zeolite crystals were removed from the remaining liquid by filtration, washed with water, and dried.

Example 5

Copper-Exchange Procedures

The ZSM-5 crystals prepared in the previous examples were readied for copper exchange by calcination at 480° C. in flowing nitrogen for three hours followed by a 540° C. treatment in air for three hours.

Copper was incorporated into the zeolite samples of Examples 1 to 6 by excess solution, room temperature exchange with 1 M solutions of $Cu(NO_3)_2$. After four two-hour exchange procedures, the slurries were filtered and dried. The copper loading for each catalyst is supplied below.

| Example 1 | 3.8 wt % Cu |
| Example 2 | 2.6 wt % Cu |
| Example 3 | 0.7 wt % Cu |
| Example 4 | 3.6 wt % Cu |

Example 6

NO$_x$ Reduction Testing

A 0.3 g sample of copper-exchanged ZSM-5 of Example 1 is mixed with 0.75 cc of 12/60 mesh Vycor ™ chips and loaded into a glass reactor. A simulated lean burn engine exhaust whose composition is set out in Table 1 below is introduced to the reactor at 0–8 psig and 80 WHSV. The temperature is then ramped to 500° C. to condition the catalyst. After cooling the catalyst to 200° C., the temperature is then raised in a step fashion so that the NO$_x$ reduction activity of the catalyst can be evaluated at each 50° C. increment. After the initial fresh activity cycle, the catalyst undergoes an accelerated aging test by holding the temperature at 800° C. for five hours. The catalyst temperature is again reduced to 200° C. and the aged activity of the catalyst is again determined in stepwise fashion at 50° C. increments. This process is repeated for the catalysts of Examples 2 to 4.

The fresh activities of the catalysts of Examples 1, and 4 are similar. However, as shown in Table 2, the catalyst employed in the present invention (Example 4) retains 90% of its maximum NO$_x$ reduction activity after aging compared to 70% for the catalyst of Example 1.

TABLE 1

| Test Gas Composition | |
| --- | --- |
| Nitric Oxide, ppm | 680 |
| Propylene, ppm | 400 |
| Hydrogen, ppm | 330 |
| Carbon Monoxide, ppm | 1020 |
| Carbon Dioxide, % | 10 |
| Oxygen, % | 4 |
| Water, % | 3 |
| Nitrogen, % | Balance |

TABLE 2

| | Retention of NO$_x$ Abatement Activity | |
| --- | --- | --- |
| | Maximum Fresh NO$_x$ Conversion, % | Retention of Activity After Aging, % |
| Example 1 | 34 | 70 |
| Example 2 | 20 | 62.5 |
| Example 3 | 22.5 | 100 |
| Example 4 | 35 | 90 |

The catalyst of the present invention (Example 4) retaining 90% of its fresh activity represents an improvement over the high silica-to-alumina ratio sample (Example 3) despite the retention by the latter of 100% NO$_x$ reduction activity because the absolute NO$_x$ reduction activity of the former is significantly greater (31.5% vs 22.5%). The conversion activity of the catalyst of Example 3 is significantly lower than that for the catalyst of the present invention. This activity difference can not be overcome by addition of catalyst because the hydrocarbons reducing NO$_x$ are fully depleted by the time the gas passes through the original catalyst bed fill. Those species that do not react with the NO$_x$ are combusted to CO$_x$ so the catalyst of Example 3 is of limited utility due to low absolute NO$_x$ reduction activity under the specific example conditions. In contrast, the catalyst of the present invention can have an absolute NO$_x$ reduction activity of at least 25, or even 30% or more after aging.

What is claimed is:

1. A method for reducing nitrogen oxides contained in an exhaust gas from an internal combustion engine operating under lean burn conditions, which comprises contacting said exhaust gas at a temperature of at least 300° C. with a hydrothermally stable catalyst comprising a transition metal and a zeolite having the structure of ZSM-5, said zeolite being prepared by in-situ crystallization of an aggregate comprising ZSM-5 seeds, silica, and a crystalline silicate, wherein said exhaust gas has a molar ratio of hydrocarbons to nitrogen oxides of at least the stoichiometric ratio, said reducing is substantially effected by hydrocarbon reductant and said catalyst is capable of an absolute NO$_x$ conversion activity of 30% or more after aging at 800° C. for 5 hours.

2. The method of claim 1 wherein said molar ratio ranges from 1 to 10 times the stoichiometric ratio, and said transition metal is selected from the group consisting of copper, zinc, vanadium, chromium, manganese, iron, cobalt, nickel, rhodium, palladium, platinum, and molybdenum.

3. The method of claim 1 wherein said transition metal comprises copper.

4. The method of claim 1 wherein said zeolite contains alkali metal ions or alkaline earth metal ions.

5. The method of claim 1 wherein said lean burn conditions comprise an air-to-fuel ratio of at least 14.7.

6. The method of claim 1 wherein said lean burn conditions comprise an air-to-fuel ratio of 18 to 23.

7. The method of claim 1 wherein said contacting occurs at a temperature of at least 500° C..

8. The method of claim 1 wherein said exhaust gas is contacted with said catalyst at a space velocity no greater than 500,000 vol/vol per hour on a gas hourly basis.

9. The method of claim 1 wherein said zeolite is prepared from an aggregate which comprises a non-clay added source of silica.

10. The method of claim 1 wherein said zeolite is prepared in the presence of an organic directing agent.

11. The method of claim 10 wherein said organic directing agent comprises tetraalkylammonium halide.

12. The method of claim 10 wherein said organic directing agent comprises tetrapropylammonium bromide.

13. The method of claim 10 wherein said organic directing agent comprises n-alkylamine.

14. The method of claim 10 wherein said organic directing agent comprises n-propylamine.

15. The method of claim 1 wherein said aggregate comprises a clay component selected from the group consisting of kaolin, halloysite, montmorillonite, illite, and dickite.

16. The method of claim 1 wherein said aggregate comprises kaolin.

17. The method of claim 1 wherein said aggregate is calcined at a temperature of at least 540° C. prior to said crystallization of the zeolite.

18. The method of claim 1 wherein said aggregate is in the form of a structure suitable for high flow applications.

19. The method of claim 18 wherein said aggregate is in a form selected from the group consisting of honeycombed monoliths, spheroids, and cylinders.

20. The method of claim 1 wherein said catalyst comprises said zeolite as a wash coat on a support.

* * * * *